United States Patent [19]

Kappel et al.

[11] Patent Number: 5,704,700

[45] Date of Patent: Jan. 6, 1998

[54] LASER ILLUMINATED IMAGE PROJECTION SYSTEM AND METHOD OF USING SAME

[75] Inventors: David W. Kappel, San Diego; David E. Hargis, La Jolla, both of Calif.

[73] Assignee: Proxima Corporation, San Diego, Calif.

[21] Appl. No.: 506,097

[22] Filed: Jul. 24, 1995

Related U.S. Application Data

[63] Continuation-in-part of Ser. No. 292,619, Aug. 18, 1994, which is a continuation-in-part of Ser. No. 279,943, Jul. 25, 1994, Pat. No. 5,517,263.

[51] Int. Cl.$^6$ .................................................. G03B 21/14
[52] U.S. Cl. ............................. 353/31; 348/771; 345/31
[58] Field of Search ................................ 353/31, 34, 94, 353/37, 122; 359/38, 48, 69, 72, 10, 11, 27; 348/744, 745, 766, 771, 790, 742, 800, 801, 802; 435/87, 31

[56] References Cited

U.S. PATENT DOCUMENTS

| | | |
|---|---|---|
| 4,734,558 | 3/1988 | Nakano et al. |
| 5,192,946 | 3/1993 | Thompson et al. |
| 5,206,674 | 4/1993 | Puech et al. ............................ 353/31 |
| 5,255,082 | 10/1993 | Tamada ................................. 353/31 |
| 5,260,728 | 11/1993 | Yoshioka et al. ...................... 353/34 |
| 5,317,348 | 5/1994 | Knize .................................... 353/37 |
| 5,465,174 | 11/1995 | Sprotbery .............................. 353/31 |
| 5,485,225 | 1/1996 | Deter et al. ............................ 348/744 |
| 5,565,933 | 10/1996 | Reinsch ................................. 353/31 |
| 5,589,955 | 12/1996 | Amako et al. ......................... 359/10 |

Primary Examiner—William Dowling
Attorney, Agent, or Firm—Bernard L. Kleinke; Peter P. Scott

[57] ABSTRACT

The laser illuminated image projection system includes a microlaser array coupled with a beam shaper to produce an exceptionally bright projection light beam. In one embodiment, the beam shaper includes a binary phase plate to modify the shape and intensity profile of the projection light beam. In another embodiment, the beam shaper includes a microlens array arrangement. In yet another embodiment, the beam shaper includes a diffuser arrangement. A light valve modifies the projection light beam to generate an output light beam indicative of an image. A projection lens arrangement focuses the output light beam onto a remote surface to reproduce the image thereon.

45 Claims, 10 Drawing Sheets

LAYOUT
UNIT MAGNIFICATION RELAY: NA = .052

SPATIAL FREQUENCY IN CYCLES PER MILLIMETER
POLYCHROMATIC GEOMETRIC MODULATION TRANSFER FUNCTION
UNIT MAGNIFICATION RELAY: NA = .052
MTF FOR 0.5500 MICRONS TO 0.5500 MICRONS

LASER ILLUMINATED IMAGE PROJECTION SYSTEM AND METHOD OF USING SAME

CROSS REFERENCE TO RELATED APPLICATIONS

This application is a continuation-in-part patent application Ser. No. 08/292,619, filed Aug. 18, 1994, entitled "LASER ILLUMINATED IMAGE PRODUCING SYSTEM AND METHOD OF USING SAME," which is a continuation-in-part patent application of U.S. patent application Ser. No. 08/279,943, filed Jul. 25, 1994, and entitled "IMAGE PROJECTION SYSTEM AND METHOD OF USING SAME," now U.S. Pat. No. 5,517,263, foregoing patent and patent applications are each hereby incorporated by reference as if fully set forth herein.

TECHNICAL FIELD

The present invention relates in general to an improved image projection system and a method of using it. The invention more particularly relates to a highly efficient light source which may be used in conjunction with a compact size image projection system to project an extremely bright image in an efficient and relatively low cost manner, and a method of using it.

BACKGROUND ART

Projection systems for projecting images onto a remote surface are known. Such systems originally produced only a faint image on the remote surface. To effectively utilize such a projection system it was necessary to dim the ambient light sufficiently to enable the image to stand out from the background surrounding the image on the surface.

Bright light sources were subsequently introduced into projection systems, thereby generating a very bright image on a remote surface which could be distinguished from the surrounding background. The light sources included metal halide and xenon lamps which were capable of producing the necessary lumen output to project a bright image onto the remote surface, even in the presence of relatively bright ambient light. Unfortunately, these projection systems have been inefficient in utilizing the lumen output of the light source. Furthermore, the housing required to enclose these projection systems have been bulky and unwieldy, making it difficult to easily transport the projection systems. These projection systems have also been quite expensive, resulting in the projection systems being available substantially only to large corporations with the financial ability to purchase such an expensive item.

An efficient and compact projection system is described in U.S. patent application Ser. No. 08/292,619, filed Aug. 18, 1994, entitled "LASER ILLUMINATED IMAGE PRODUCING SYSTEM AND METHOD OF USING SAME," which is incorporated by reference as if fully set forth herein. As described therein, the light source comprised a single laser for a generating a very bright coherent and polarized light beam to project a monocolored image. Alternative embodiments included three separate lasers, each one of the lasers generated a different colored polarized and coherent light beam, for generating three different monocolored light beams to project a full color image.

In the full color projection system, a lens arrangement was disposed between the light sources and an associated small light valve to expand the size of the light beams generated by each of the lasers to match substantially the incident surface area of the light valve. The light valve was controlled to modify the incident light beam to produce the desired image which was to be projected on to a remote surface. As a result, an exceptionally bright image was projected onto the remote surface, even where the ambient light was relatively bright.

By using a laser as a light source and a small light valve to project the image, the size of the projection system was made to be exceptionally compact. Being compact, the projection system was easily transported, and could even be stored under an airplane seat during travelling. Additionally, the laser was aligned initially with the light valve to eliminate the need for components to polarize the light beam emanating from the laser.

As a result, a substantial portion of the laser light beam was utilized to project the bright image. Thus, the compact projection system was more efficient than the prior known image projection systems. Furthermore, the projection system was also relatively inexpensive as the need for some components had been eliminated.

While the compact projection system described in U.S. patent application Ser. No. 08/292,619 projects a very bright image in an efficient manner, the efficiency of the projection system is somewhat limited by the physical characteristics of the components. In this regard, the light beam generated by the laser is substantially circular, while the conventional light valve is substantially rectangular. To ensure that the circular light beam was incident on substantially the entire incident surface of the rectangular light valve, the light beam was expanded to be slightly larger than incident surface. As a result, a portion of the light beam was not utilized, thereby reducing the overall efficiency of the projection system and limiting the brightness of the projected image.

Therefore, it would be highly desirable to have a new and improved laser illuminated image projection system which can project an even brighter image in a more efficient manner, and a method of using it. Such a laser illuminated image projecting system should be extremely compact in size.

A property of the light beam generated by the laser of the laser projection system described above is a Gaussian intensity profile associated therewith. The Gaussian intensity profile is representative of the intensity differences within the conventional laser beam. In this regard, the center of the laser beam has a relatively high intensity level. The intensity level decreases radially outwardly from the center of the laser beam, resulting in the perimeter of the laser beam having a lower intensity level than the center.

Although an acceptable bright image is projected, the change in intensity levels due to the characteristic Gaussian intensity profile of the laser light beam detracts from the projected image. The contrast between the center of the projected image and the perimeter of the projected image could produce undesired variations due to a non-uniform distribution of intensity over the surface of the light valve.

Therefore, it would also be highly desirable to have a new and improved laser illuminated image projection system which can provide a laser light illuminated light valve where the light has a uniform intensity distribution confined substantially to the pixel portion of the light valve, for projecting an extremely bright image in a highly efficient and effective manner. Such a system should be relatively inexpensive to manufacture and to use, and the system is very compact in size.

DISCLOSURE OF INVENTION

Therefore, the principal object of the present invention is to provide a new and improved laser illuminated image projection system, and a method of using it, to project extremely bright images in a highly efficient manner. Such a new and improved laser illuminated image projection system is compact in size and is relatively inexpensive to manufacture.

Another object of the present invention is to provide such a new and improved laser illuminated image projection system which can provide a laser light illuminated light valve where the light has a uniform intensity distribution for projecting an extremely bright image, and where the light is confined substantially to the pixel portion of the light valve.

Briefly, the above and further objects of the present invention are realized by providing a new and improved laser illuminated image projection system which can project extremely bright images according to a novel image illumination method and apparatus of the present invention.

The laser illuminated image projection system includes one or more microlaser devices and a beam shaper to produce an exceptionally bright projection light beam. In one form of the invention, the beam shaper includes a binary phase plate to modify the shape and intensity profile of the projection light beam. In another form of the invention, the beam shaper includes a microlens array arrangement. In yet another form of the invention, the beam shaper includes a diffuser arrangement. A light valve modifies the projection light beam to generate an output light beam indicative of an image. A projection lens arrangement focuses the output light beam onto a remote viewing surface to reproduce the image thereon.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 9:
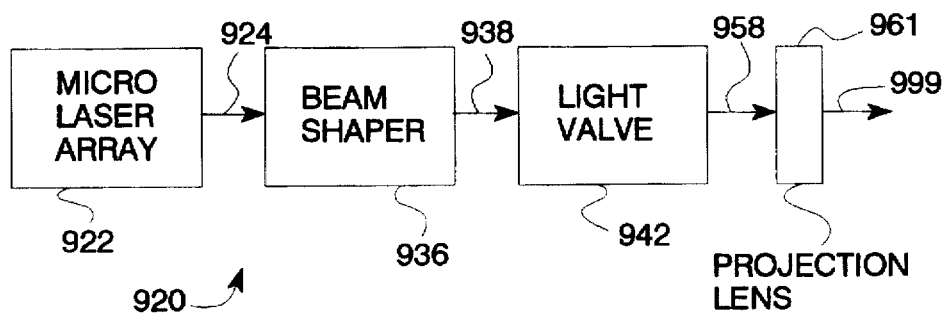
FIG. 9 is a block diagram of another laser illuminated image projection system which is also constructed in accordance with the present invention.

Referring now to the drawings, and more particularly to FIG. 9 thereof, there is shown a laser illuminated image projection system 900 which is constructed in accordance with the present invention. The image projection system 900 includes a projection light arrangement 920 for generating a projection light 938. A light valve 942 manipulates the projection light 938 to produce an output light 958. The output light 958 is projected onto a remote surface (not shown) by a projection lens 961 as a projected image light 999.

Considering now the projection light arrangement 920 in greater detail, the projection light arrangement 920 generates an extremely bright projection light beam 938 having a uniform intensity profile, and can be used in accordance with laser illuminated image projection systems, such as the laser illuminated image projection systems illustrated in FIGS. 1–6, and described hereinafter in greater detail.

The projection light arrangement 920 includes a microlaser array 922 and a beam shaper 936 which cooperate to produce the projection light beam 938. A light valve 942 is disposed in the optical path of the projection light beam 938 to selectively modulate it for forming an output light beam 958 which is indicative of a desired image (not shown) to be projected onto a remote surface (not shown). The light valve 942 is shown only diagrammatically in FIG. 9 for ease of understanding, and could comprise either a transmissive or a reflective light valve.

In operation, the microlaser array 922 generates a laser light beam 924 which is incident on the beam shaper 936. The beam shaper 936 manipulates optically the laser light beam 924 to produce the projection light beam 938 wherein the geometry of the projection light beam 938 substantially matches the geometry of the light valve 942 and wherein the intensity profile of the projection light beam 938 is uniform, i.e., "flat top" or "top hat" distribution. The light valve 942 modulates the projection beam 938 to produce the output light beam 938 for projecting the image on the remote surface.

Considering now the microlaser array 922 in greater detail, the microlaser array 922 includes a plurality of laser sources.

The preferred laser source is a microlaser which is a form of a diode pumped solid-state laser. For example, a near-IR AlGaAs semiconductor diode laser could be used as a pump source for a rare-earth doped intra-cavity doubled visible laser. Other laser sources could also be used, including red AlGaInP semiconductor diode lasers, green and blue ZnSe-based diode lasers and blue AlGaInN diode lasers. Green and blue frequency-doubled InGaAs and AlGaAs semiconductor lasers could also be used to achieve satisfactory results. These lasers incorporate doublers such as wave guide doublers, resonant doublers, or periodically-poled doublers.

Although a single red, a single green and a single blue microlaser could be used for full display applications requiring moderate brightness levels of less than about 100 lumens, brighter levels are obtained by using a multiplicity of each color of microlasers. In this regard, increasing the number of microlasers of each color effectively increases the lumens output for each color, thereby increasing the overall brightness of the projected image. Similarly, for monocolored microlaser systems, increasing the number of microlasers will result in a brighter monocolored image. In addition to providing a brighter image, the use of a plurality of microlasers facilitates the generation of scalable brightness levels to achieve more control over the brightness of the projected image.

In the preferred embodiment of the present invention, the plurality of microlasers are arranged as a monolithic microlaser array. The array can be either a linear microlaser array or a two dimensional microlaser array. Multiple individual microlasers could be utilized instead with less satisfactory results, though. The advantages of using monolithic microlaser arrays instead of multiple individual microlasers include compactness, common heat sinks, and common drive electronics. Only one drive is required for an entire array of microlasers because the microlaser array is pumped with a monolithic diode laser array.

The number of microlasers in a single row of a monolithic microlaser array varies according to the desired size of the projection system and the desired lumen output. Preferably, each row of the microlaser array 922 includes between about two microlasers and about twenty four microlasers. More preferably, each row of the microlaser array 922 includes between about three microlasers and about twenty two microlasers. Most preferably, each row of the microlaser array 922 includes between about four microlasers and about twenty microlasers.

Figure 10:
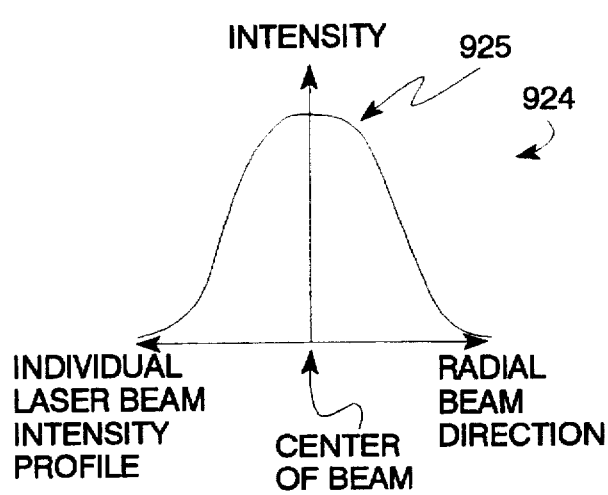
FIG. 10 is a graphical representation of a Gaussian intensity profile of a single laser light beam generated by a microlaser array of the laser illuminated image projection system of FIG. 9.

Considering now the laser light beam 924 in greater detail with reference to FIGS. 9 and 10, the laser light beam 924 is generated by the combination of each of the microlasers contained in the microlaser array 922. Each individual microlaser generates a substantially circular and coherent individual laser beam having a radially symmetric Gaussian intensity profile associated therewith, such as individual laser beam 925 of FIG. 10. In this regard, the intensity of individual laser beam 925 is located at about the center of the beam 925. The intensity decreases radially outwardly from the center, resulting in the perimeter of the beam 925 having a lower intensity than the center of the beam 925. The combination of all of the individual laser beams emanating from each row of microlasers in the microlaser array 922 yields a row of closely spaced circular laser beams, such as a laser beam 925, which comprise the laser light beam 924.

Figure 11:
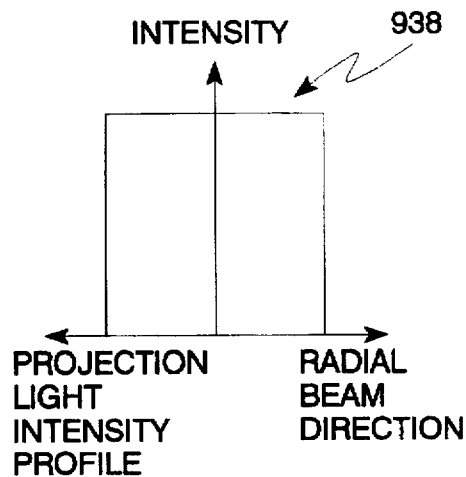
FIG. 11 is a graphical representation of a uniform intensity profile of projection light produced by the laser illuminated image projection system of FIG. 9.

Considering now the beam shaper 936 in greater detail with respect to FIG. 9, the beam shaper 936 is preferably a binary phase plate comprising diffractive optical elements as manufactured by Teledyne Brown Engineering of Huntsville, Ala. The binary phase plate converts the Gaussian intensity profile of each individual circular laser beam, such as laser beam 925, to a rectangular projection light beam having a uniform intensity profile. The combination of all of the individual rectangular projection light beams results in the projection light beam 938 having a rectangular shape and having an overall uniform intensity profile FIG. 11. The resulting rectangular projection light beam 938 is focused on to the light valve 942, wherein the geometry of the projection light beam 938 substantially matches the geometry of the light valve 942. In this way, substantially all of the laser light generated by the microlaser array 922 is incident on the light valve 942, and is uniformly distributed across the light valve 942.

Figure 12:
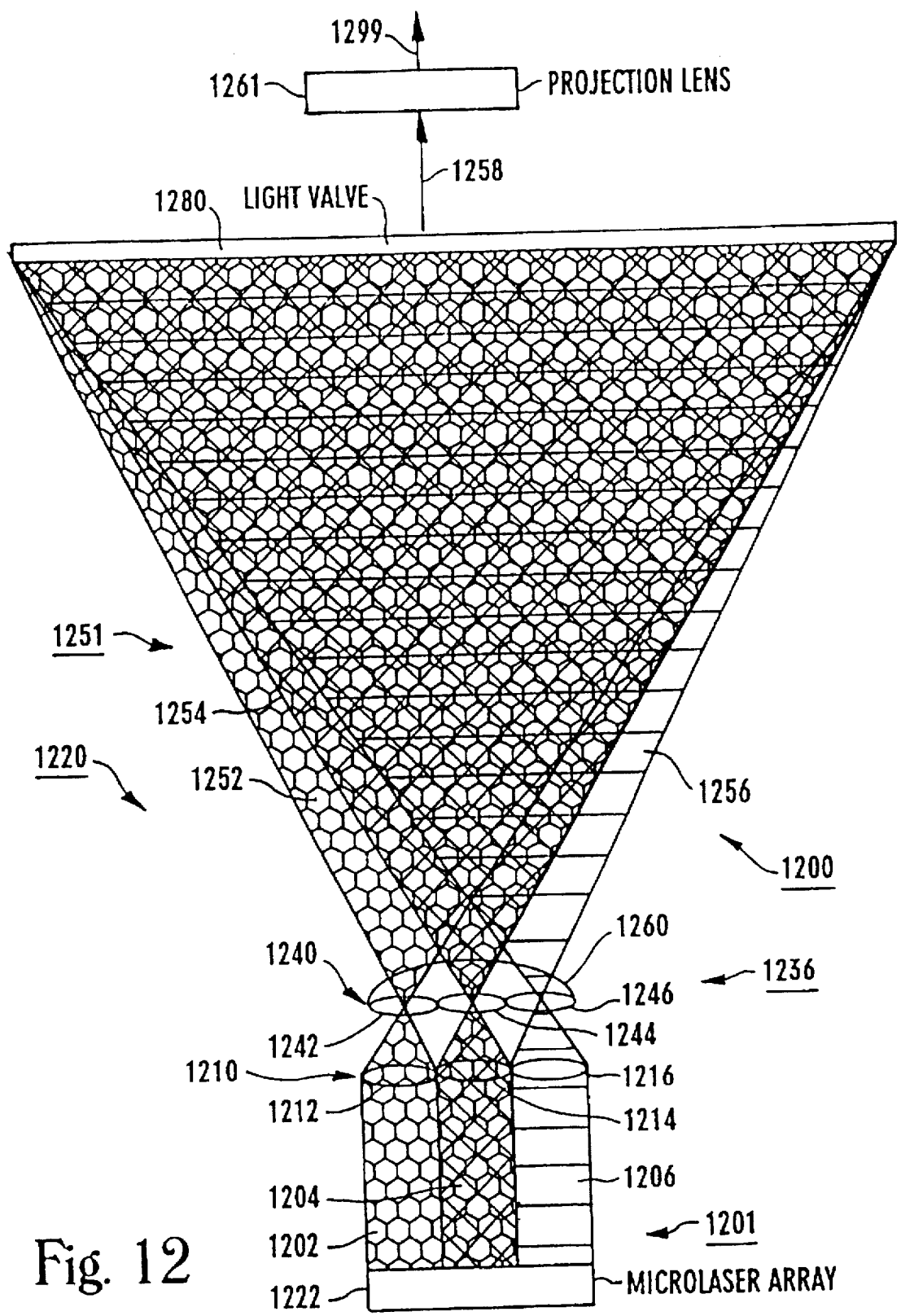
FIG. 12 is a diagrammatical block diagram of yet another laser illuminated image projection system, which is also constructed in accordance with the present invention.

Referring now to FIG. 12, there is shown another laser illuminated image projection system 1200 which is also constructed according to the present invention. The image projection system 1200 is similar to image projection system 900, and includes a projection light arrangement 1220 to produce a projection light 1251, a light valve 1280 to modulate the projection light 1251 to produce output light 1258, and a projection lens 1261 for projecting the output light 1258 as a projected image light 1299 onto a remote surface (not shown).

Considering now the projection light arrangement in greater detail, the projection light arrangement 1220 includes a microlaser array 1222 and a beam shaper 1236 for producing and directing a projection light beam 1251 onto a light valve 1280.

Considering now the beam shaper 1236 in greater detail, the beam shaper 1236 includes a double lenticular microlens array device having a first microlens array 1210 for sampling a laser beam 1201 generated by a microlaser array 1222.

A second microlens array 1240 cooperates with the first microlens array 1210 to image the sampled laser beam 1201 onto a light valve 1280 as projection light beam 1251. Attached to the second microlens array 1240 is a field lens 1260 for flooding the light valve with the projection light beam 1251, wherein the geometry of the projection light beam 1251 substantially matches the geometry of the light valve 1280 and the intensity profile of the projection light beam 1251 is substantially uniform.

In operation, the laser beam 1201 impinges on the sampling microlens array 1210 and is sampled thereby. The sampled laser beam 1201 is then focused onto the imaging microlens array 1240 by the first microlens array 1210. The second microlens array 1240 images the sampled laser beam 1201 onto the light valve 1280 as the projection light beam 1251.

The projection light beam 1251 exiting the second microlens array is focused by the field lens 1260 to confine substantially the light beam 1251 to the active portion only of the light valve 1280. As a result, the geometry of the laser beam 1201 is transformed to substantially match the geometry of the light valve 1280. In addition, the Gaussian intensity profiles associated with the individual laser beams comprising laser beam 1201 are transformed into a uniform intensity profile associated with the projection light beam 1251.

Considering now the first microlens array 1210 in greater detail with reference to FIG. 12, the first microlens array 1210 includes a plurality of microlenses, such as microlenses 1210, 1214 and 1216. The remaining microlenses are not shown. The number of microlenses required is determined by the number of associated microlasers of the microlaser array 1222.

For ease of discussion, microlens array 1210 is shown in FIG. 12 as including only three microlenses 1212, 1214 and 1216. Coherent beam segments 1202, 1204 and 1206 generated by one or more microlasers (not shown) of the array 1222 impinge on the microlenses 1212, 1214 and 1216, respectively. In this regard, the microlenses sample the associated laser beam segments. Each of the laser beam segments 1202, 1204 and 1206 has an associated Gaussian intensity profile similar to that of laser beam 925 of FIG. 10.

As microlenses 1212, 1214 and 1216 are substantially similar, only microlens 1212 will be discussed hereinafter in greater detail. Microlens 1212 is a rectangular lens element for sampling the circular coherent laser beam 1202. The horizontal and vertical dimensions of the rectangular lens element are proportional to the corresponding horizontal and vertical dimensions of the light valve 1280 to facilitate the matching of the geometry of the laser beam 1201 with the geometry of the light valve 1280.

As an example, assume that the lens elements are preferably arranged in a matrix of about four lens elements by four lens elements for a given microlaser to achieve the desired result. Tone, a laser projection system having only one microlaser would have only one sampling microlens array including a matrix of four lens elements by four lens elements in the microlaser array 1210 to sample the laser beam 1202. For such an example, a linear microlaser array having two side-by-side microlasers require two 4 by 4 microlenses to form the microlens array 1210 to sample the laser beams wherein a matrix of four lens elements by eight lens elements would be utilized. The configuration can be expanded to any number of microlasers of the microlaser array. Thus, a microlaser array of twenty side-by-side microlasers would require a four by eighty microlens sampling array.

It will be understood by one skilled in the art that the matrix of lens elements used in each microlens may vary from the matrix set forth herein without deviating from the invention as contemplated.

The circular laser beam 1202 sampled by the rectangular lens elements is focused onto the imaging microlens array 1240. In this regard, the lens elements of the sampling array focus a group of individual diverging rectangular microbeams onto the second microlens array 1240. The diverging microbeams form an overlapping pattern of light on the face of the second microlens array 1240. Thus, the circular geometry of the laser beam 1202 is made to substantially match proportionately the rectangular geometry of the light valve 1280. The sampling of circular laser beams 1204 and 1206 is similarly performed by microlenses 1214 and 1216, respectively.

Considering now the second microlens array 1240 in greater detail with respect to FIG. 12, the second microlens array 1240 includes a plurality of microlenses, such as microlenses 1242, 1244 and 1246. The remaining number of microlenses are not shown.

Microlenses 1242, 1244 and 1246 cooperate with the respective microlenses 1212, 1214 and 1216 to image the rectangular sampled laser beam portions of laser beams 1202, 1204 and 1206, respectively, onto the light valve 1280 as projection light beams 1252, 1254 and 1256, respectively. In this way, the rectangular portions of the sampled laser beams 1202, 1204 and 1206 are made to correspond dimensionally to the light valve.

The number of the microlens of the microlaser array 1210 is dependent upon the number of microlasers in the microlaser array 922. The microlens arrays are spaced apart sufficiently to permit the microbeams to overlap and thus to flood the face of the second array. A heat sink disposed between stacked microlens arrays enables the dissipation of excess heat. The total length of a 20 element microlens array is about 1.0 to about 1.5 centimeters. If required, microlens arrays can be stacked on one another so that a two dimensional matrix of microlenses is constructed.

Considering now the field lens 1260 in greater detail with reference to FIG. 12, the field lens 1260 is incorporated into the second microlens array 1240 to focus the light exiting the second microlens array 1240 toward the center of the light valve 1280. As a result, the projection microbeams 1252, 1254 and 1256 exiting the second microlens array 1240 are superimposed on top of one another over the entire surface of the light valve 1280. By superimposing the projection light beams 1252, 1254 and 1256, the intensity of each beam 1252, 1254 and 1256 is spread across the entire light valve 1280, and the resulting intensity profile of the composite projection light beam 1251 is substantially uniform. In this regard, the intensity profile for projection light beam 1251 is substantially similar to that of projection light beam 938 of FIG. 11.

From the foregoing, it may be seen that the circular laser beams having a Gaussian intensity profile are transformed by the beam shaper 1200 to produce projection light beam 1251 having a substantially rectangular geometry corresponding to that of the light valve 1280. The transformed projection light beam 1251 also has an associated uniform intensity profile. Furthermore, the transformation performed by the beam shaper 1200 facilitates the destruction of the coherent characteristic of the laser beam 1201. Thus, the laser beam 1201 is utilized in an efficient manner to produce a very bright projection light beam 1251 having a uniform intensity profile, and wherein the occurrence of fringing is greatly reduced or even eliminated.

Figure 13:
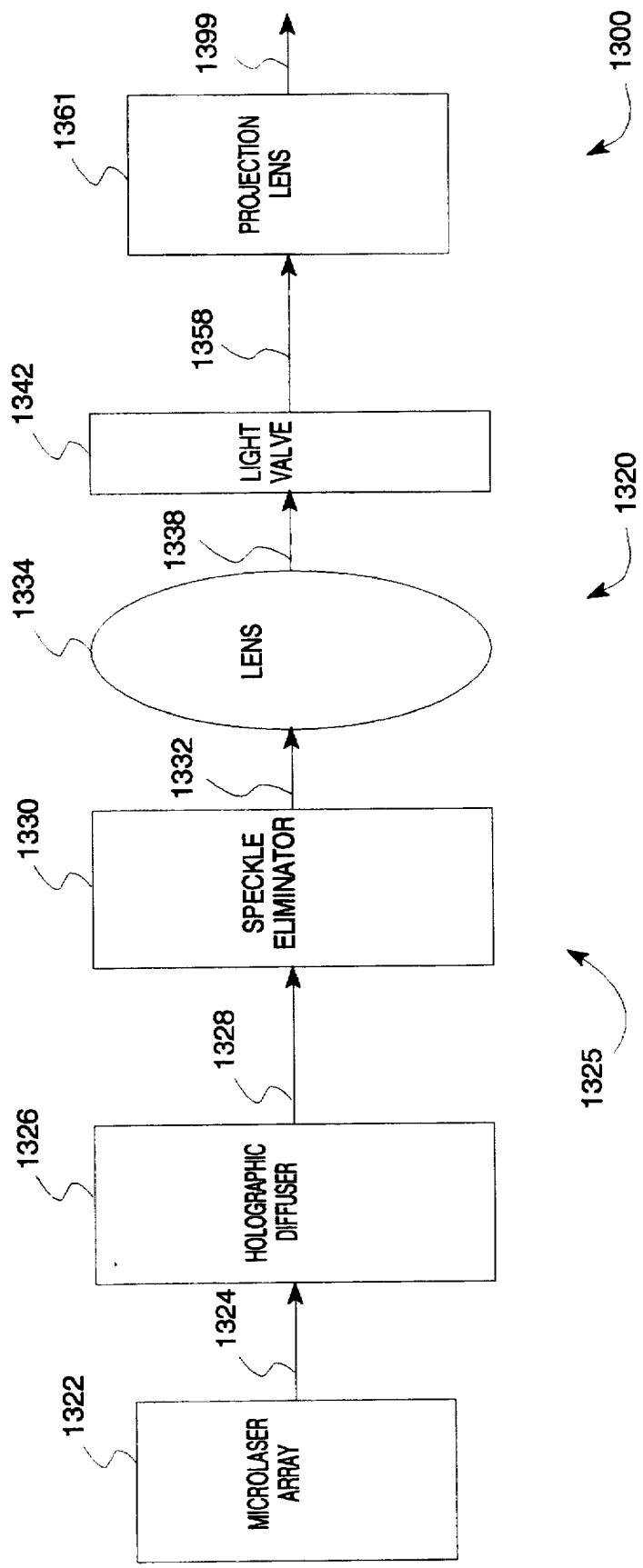
FIG. 13 is a block diagram of yet another laser illuminated image projection system, which is also constructed in accordance with the present invention.

Referring now to FIG. 13, there is shown yet another laser illuminated image projection system 1300 which is also constructed in accordance with the present invention. The image projection system 1300 is similar to image projection system 1200, and includes a projection light arrangement 1320 to produce projection light 1338, a light valve 1342 to modulate the projection light 1338 to produce output light 1358, and a projection lens 1361 for projecting the output light 1358 as projected image light 1399 onto a remote surface (not shown).

Considering now the projection light arrangement 1320 in greater detail, the projection light arrangement 1320 includes a microlaser array 1322 and a beam shaper 1325 for producing and directing a projection light beam 1338 onto a light valve 1342.

Considering now the beam shaper 1325 in greater detail, the beam shaper 1325 includes a holographic diffuser 1326 for sampling a circular laser beam 1324 having a Gaussian intensity profile to produce a sampled light beam 1328 having a uniform intensity profile. The holographic diffuser 1326 samples the laser beam 1324 in a manner similar to that performed by the microlens arrays 1210 and 1240 described above in connection with beam shaper 1200 of FIG. 12. Thus, the holographic diffuser 1326 transforms the intensity profile of the laser beam 1324 from Gaussian to uniform.

Different diffusion angles are required of the holographic diffuser 1326 for each of the two dimensions, such as x and y dimensions, to generate the required aspect ratio. Such a holographic diffuser 1326 is manufactured by Physical Optics Corporation of Los Angeles, Calif.

The beam shaper 1300 further includes a speckle eliminator 1330, which could include another diffuser, for removing speckle associated with the sampled light beam 1328. A vibration mechanism (not shown) is coupled to the speckle eliminator 1330 for vibrating the speckle eliminator 1330 in a circular motion. In addition to removing speckle, the speckle eliminator 1330 also destroys the coherence of the sampled light beam 1328 to reduce fringing. The light beam 1332 exiting the speckle eliminator 1330 is thus substantially speckle free, non-coherent, substantially rectangular in geometry, and has a uniform intensity profile.

A collimating lens 1334 collimates light beam 1332 as projection light beam 1338, wherein the projection light beam 1338 is incident on a light valve 1342.

In operation, the laser light beam 1324 having a Gaussian intensity profile enters the holographic diffuser 1326. The diffuser 1326 transforms the laser light beam 1324 into the rectangular sampled light beam 1328 having a uniform intensity profile. The sampled light beam 1328 then enters the speckle eliminator 1330 which removes speckle and provides a more uniform light pattern.

The speckle eliminator 1330 is also a diffuser device. By vibrating the speckle eliminator 1330 in a circular manner with the vibrating mechanism, the speckle eliminator 1330 helps remove speckle which is a known and undesirable feature of a light pattern on a surface.

The light beam 1332 exiting the speckle eliminator enters a collimating lens 1334. The collimating lens 1334 collimates the light beam 1332 to produce the projection light beam 1338 because the light beam 1332 has diverged somewhat since exiting the holographic diffuser 1326.

Referring now to the drawings, and more particularly to FIGS. 1 through 8 thereof, there is shown various applications of the systems shown in FIGS. 9, 12 and 13.

Figure 1:
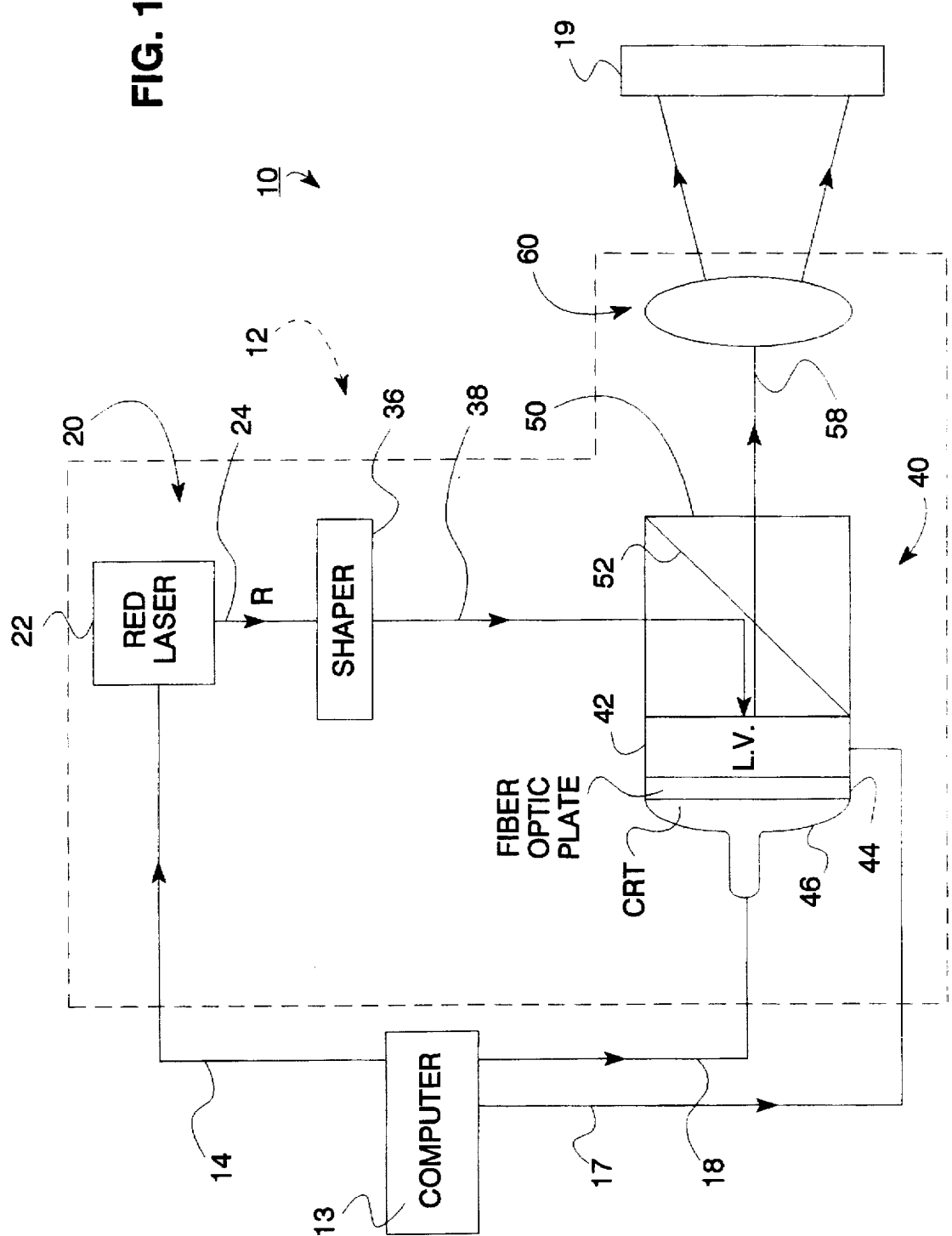
FIG. 1 is a block diagram of a laser illuminated image projection system, which is constructed in accordance with the present invention.

As shown in FIG. 1, there is shown a laser illuminated image projection system 10, which is constructed in accordance with the present invention. The image projection system 10 readily projects images for viewing in accordance with the method of the present invention.

The image projection system 10 generally comprises an image generating arrangement 12 having a projection light arrangement or light source to produce a coherent projection light along an output optical path 38, a spatial light modulator 40 disposed in the output optical path 38 to modulate the coherent projection light producing an output light representative of the image to be projected along an output optical path 58, and a projection lens system 60 disposed in the output optical path 58 to project the image. The image projection system further includes a computer 13 to control the image generating apparatus 12 and a remote surface 19 for receiving the projected image.

In use, the light source 20 generates the coherent projection light along input optical path 38. The coherent projection light is modulated by the spatial light modulator 40, thereby producing the output light along the output optical path 58. The projection lens focuses the output light and projects it onto the remote surface 19 for viewing. The computer 13, connected to the light source 20 by conductor 14, and connected to the spatial light modulator 40 by conductors 17 and 18, controls and coordinates the activation of light source 20 in conjunction with the spatial light modulator 40 to generate the desired image which is projected onto the remote surface 19.

Considering now the light source 20 in greater detail, the light source 20 includes a red laser source 22, such as an array of microlasers. The red laser source is coupled to the computer 13 by conductor 14. Each microlaser (not shown) of red laser source 22. Red laser 22 functions only in one of two states, either an ON state or an OFF state. In the OFF state, the light output of the microlaser is substantially zero. When switched to the ON state, the microlaser generates a high intensity light along source optical path 24. In this way, each microlaser of the red laser source 22 can be controllably and selectively switched between their ON and OFF states to generate pulses of light along source optical path 24 whose luminosity levels vary between a substantially zero luminosity level and a maximum luminosity level.

The light source 20 further includes a beam shaper 36 disposed in the source optical path 24 to transform the laser light generated by the red laser source 22 to produce the projection light 38.

In use, the microlasers of red laser source 22 are controlled by the computer 13 via conductor 14 to switch between their ON and OFF states, thereby generating pulses of laser light having an amplitude varying between a minimum and a maximum luminosity level along the source optical path 24. The pulses of laser light impinge the beam shaper 36, wherein the laser light is transformed, resulting in the projection light emanating from the beam shaper 36.

Considering now the spatial light modulator 40 in greater detail, the spatial light modulator 40 includes a reflective light valve 42 for modulating the pulses of projection light along the input optical path 38 for producing the output light along the output optical path 58. The light valve 42 is a beam addressed device. In this regard, the projection light acts as a reading light for projecting the desired image. The writing light for forming the image within the light valve 42 is provided by a cathode ray tube or CRT 46. The CRT 46 is optically connected to the light valve 42 by a FIBER OPTIC PLATE 44.

The light valve 42 and the CRT 46 are connected to the computer 14 by conductors 17 and 18, respectively. In this regard, the CRT 46 is controlled to provide a writing light image representative of the desired image. The optical image generated by the CRT 46 is transferred to the light valve 42 by the FIBER OPTIC PLATE 44. Similarly, the light valve 42 is controlled by the computer 14 to further define the desired image within the light valve 42.

The spatial light modulator 40 further includes a polarizing beam splitter 50 having a reflective surface 52 to redirect the projection light onto the light valve 42. Other types of reflecting devices, including mirrors, are also contemplated and are within the scope of the present invention.

The light valve 42 is preferably a photoelectric light valve, such as the photoelectric light valve as manufactured by Ampro GrayHawk. The size and shape of CRT 46 is selected to be substantially similar to the surface area of the light valve 42 to ensure that the optical information generated by the CRT 46 is efficiently utilized by the light valve 42.

In use, the pulses of projection light enter the polarizing beam splitter 50 and are reflected by the reflecting surface towards the light valve 42. The computer 13 coordinates the controlling of the light valve 42 and the CRT 46 to modulate the projection light and to generate the output light along the output optical path 58. In this regard, substantially all of the output light generated by the light valve 42 is directed towards the projection lens system 60 to be projected onto the remote surface 19.

As a result of the switching of the microlasers of the red laser source 22, the projection light varies in luminosity between a minimum luminosity level and a maximum luminosity level. During the time that the microlasers of the red laser source 22 are in their ON state, in generating the projection light at its maximum luminosity level, the light valve 42 controls the luminosity of the projection light modulated by the light valve 42, to permit the desired image to be reproduced and projected onto the remote surface 19 with varying shades. In this regard, the light valve 42 controls the luminosity of the output light to produce a gray scaled version of the desired image to be projected.

Figure 2:
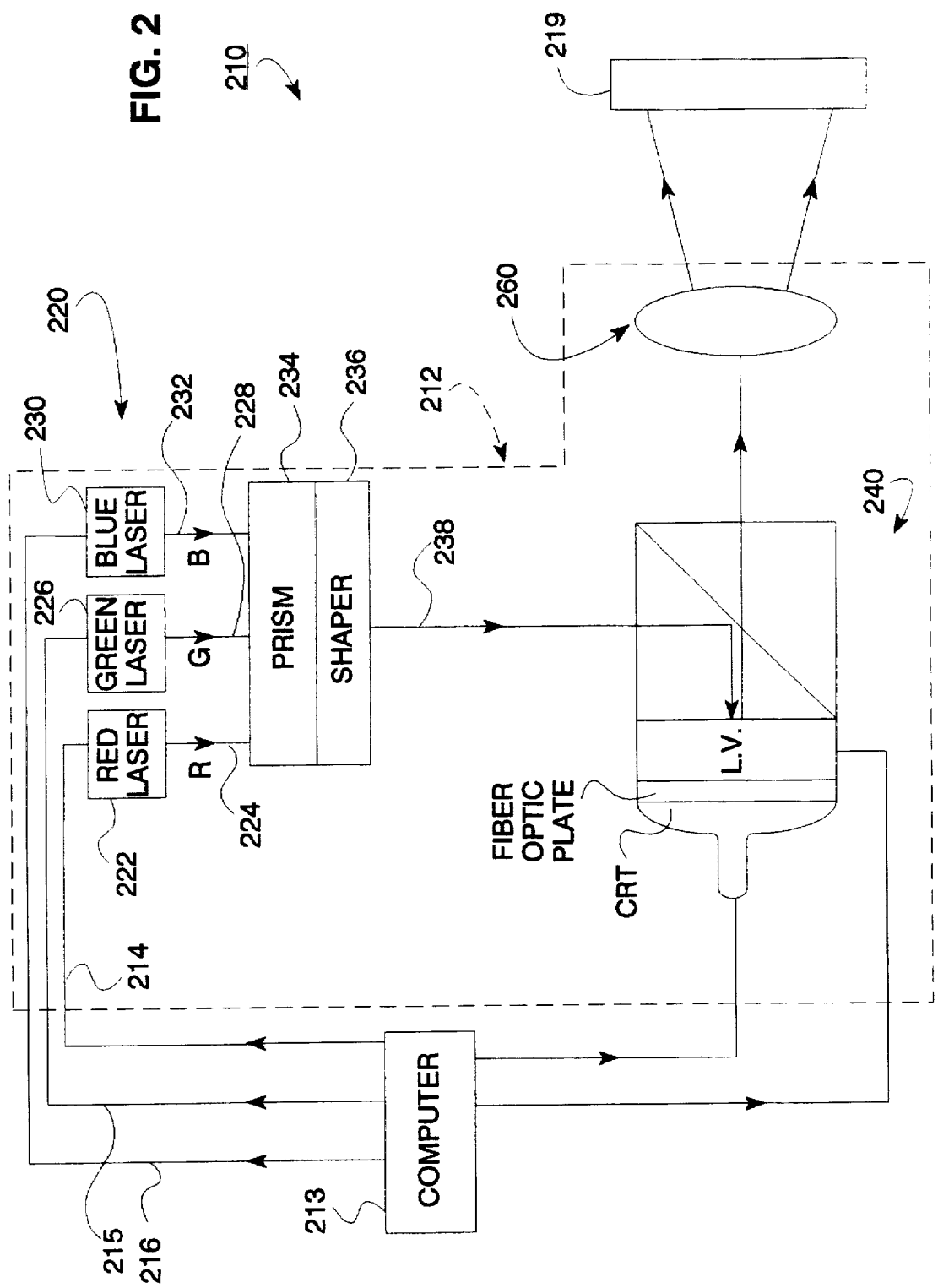
FIG. 2 is a block diagram of another laser illuminated image projection system, which is also constructed in accordance with the present invention.

Referring now to FIG. 2, there is shown another image projection system 210, which is also constructed in accordance with the present invention. The image projection system 210 is substantially similar to the image projection system 10, and includes an image generating arrangement 212, a computer 13 to control the image generating arrangement 212, and a remote surface 219 to display the projected image.

Considering now the image generating arrangement 212 in greater detail, the image generating arrangement 212 includes a projection light arrangement or light source 220 to provide mono-colored pulses of red, green, and blue projection light. The image generating arrangement 212 further includes a spatial light modulator 240 and a projection lens system 260. As spatial light modulator 240 and projection lens system 260 are substantially similar to the spatial light modulator 40 and the projection lens system 60, respectively, they will not be considered hereinafter in greater detail.

Considering now the light source 220 in greater detail, the light source 220 includes a red laser source 222 to produce a red high intensity light along source optical path 224, a green laser source 226 to generate a green high intensity light along source optical path 228, and a blue laser source 230 to generate a blue high intensity light along source optical path 220. Red laser source 222, green laser source 226 and blue laser source 230 are connected to the computer 213 by conductors 214, 215 and 216, respectively, to selectively switch each of the microlasers 20 contained within laser sources 222, 226 and 230 between their ON and OFF states. In this way, the laser sources 222, 226 and 230 can generate sequential mono-colored pulses of light, wherein each mono-colored pulse of light is generated at its maximum luminosity level.

The light source 220 further includes a prism 234 disposed in the source output path 224, 228 and 232 to focus the pulses of mono-colored high intensity light before entering a beam shaper 236. The beam shaper 236 is substantially similar to the beam shaper 36, and facilitates the transformation of each mono-colored pulse of high intensity laser light into projection light along an input optical path 238.

In operation, each of the microlasers of laser sources 222,226 and 230 are switched between their ON and OFF states in a sequential fashion to generate sequential mono-colored pulses of high intensity light. The mono-colored pulses of high intensity light are focused by the prism 234 and transformed by the beam shaper 236 to generate the projection light along the input optical path 238. In this regard, the microlasers of the red laser source 222 are switched ON and then OFF to generate red mono-colored pulses of high intensity light, which are translated into red pulses of projection light along input optical path 238. Subsequently, the microlasers of the green laser source 226 are switched ON and then OFF to generate green pulses of high intensity light. These green pulses of high intensity light are then translated into green pulses of projection light along input optical path 238. Finally, the microlasers of the blue laser source 230 are switched ON and then OFF to generate blue pulses of high intensity light. These blue pulses of high intensity light are then translated into blue pulses of projection light along the input optical path 238.

While in the preferred embodiment the microlasers of laser sources 222, 226 and 230 are each switched ON and OFF in the sequence, red laser source 222, green laser source 226 and blue laser source 230, it will be understood by one skilled in the art that other combinations and sequences are also possible.

Figure 3:
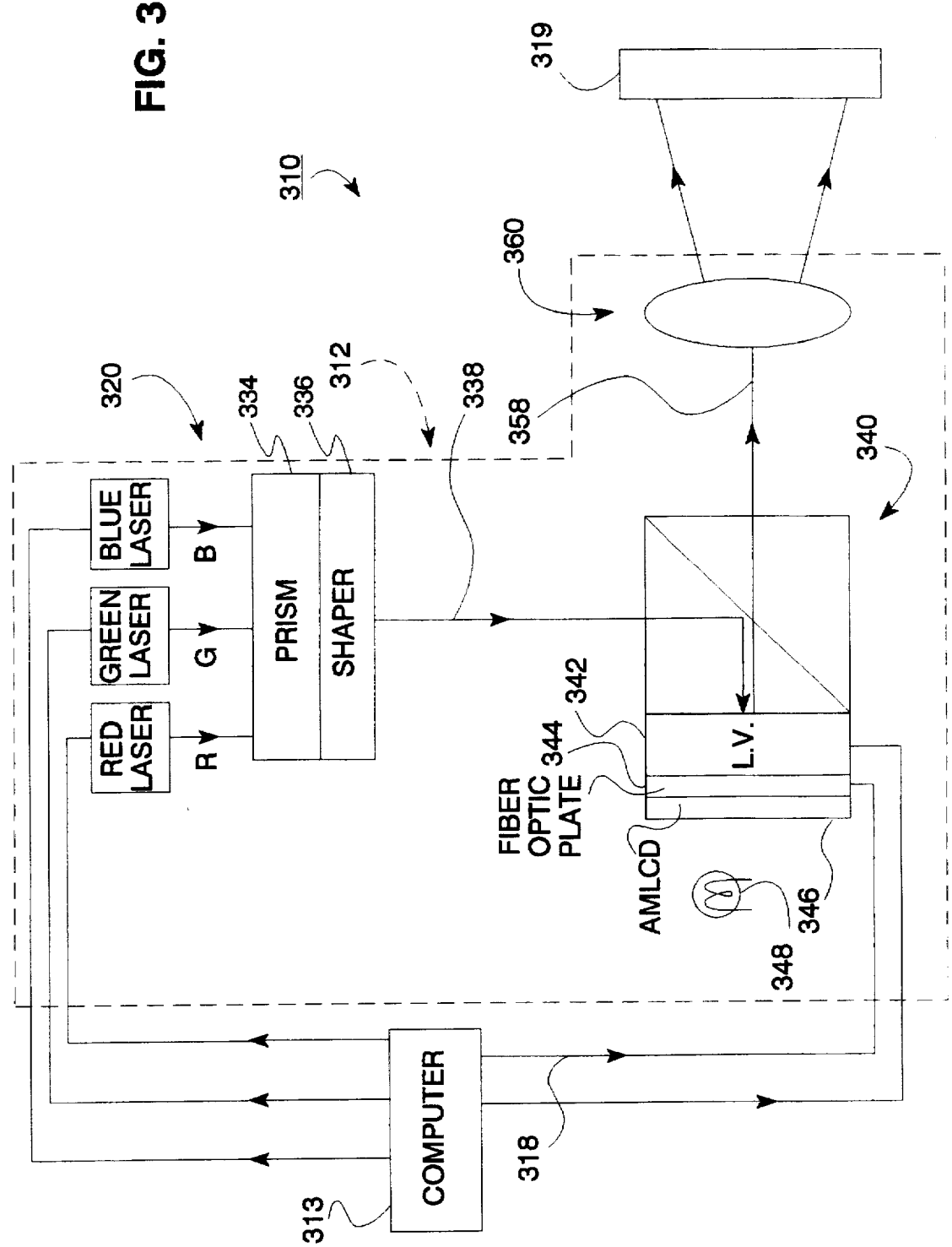
FIG. 3 is a block diagram of still another laser illuminated image projection system, which is also constructed in accordance with the present invention.

Referring now to FIG. 3, there is shown yet another image projection system 310 which is also constructed according to the present invention. The image projection system 310 is similar to the image projection system 210 and includes an image generating arrangement 312, a computer 313 to control the image generating arrangement 312, and a remote surface 319 to display the desired image.

The image generating arrangement 312 includes a projection light arrangement or light source 320 and a projection lens 360 which are substantially similar to the light source 220 and the projection lens system 260 of FIG. 2, and will not be described hereinafter in greater detail.

Considering now the spatial light modulator 340 in greater detail, the spatial light modulator 340 includes a light valve 342 for modulating a projection light from the light source 320 traveling along an input optical path 348. The light valve 342 is substantially similar to the light valve 42, and will not be described hereinafter in greater detail.

To provide a writing light for generating the desired image within the light valve 342, the spatial light modulator 340 further includes an active matrix liquid crystal display or AMLCD 346 and an incandescent light source 348. The image produced by the combination of the AMLCD 346 and the incandescent light source 348 is transmitted to the light valve 342 by a FIBER OPTIC PLATE 344 to write the image onto the light valve 342. The AMLCD 346 is connected to the computer 313 by conductor 318 to vary the writing light as required.

In operation, the incandescent light source 348 produces a writing light which is modulated by the AMLCD 346. The modulated writing light is then transferred through the FIBER OPTIC PLATE 344 to impinge the writing light surface of the light valve 342. The projection light strikes the reading light surface of the light valve 342 and is modulated accordingly to produce the output light along output optical path 358 to facilitate the projection of the desired image on the remote surface 219.

Figure 4:
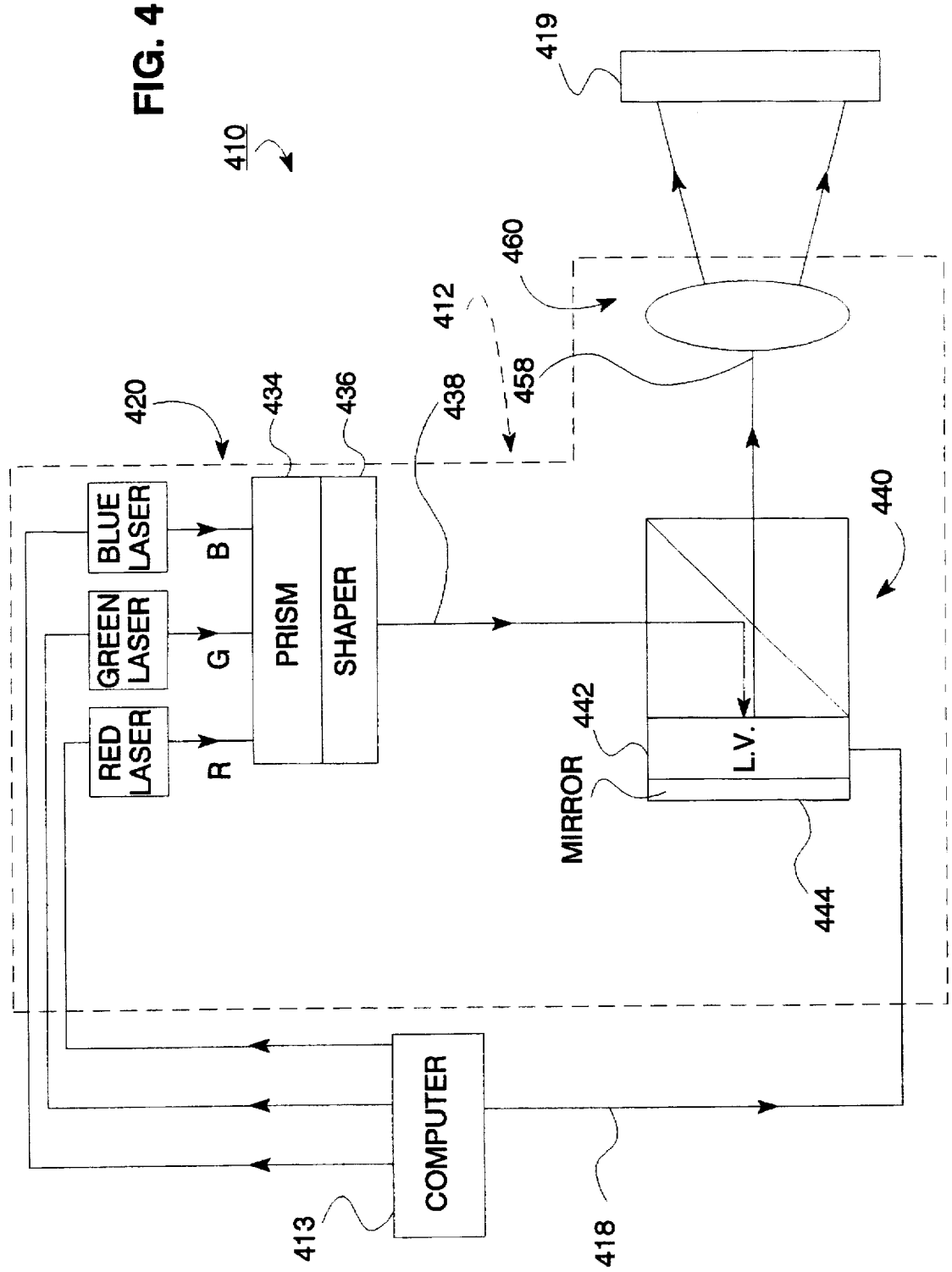
FIG. 4 is a block diagram of a further laser illuminated image projection system, which is also constructed in accordance with the present invention.

Referring now to FIG. 4, there is shown another image projection system 410 which is also constructed in accordance with the present invention. The image projection system 410 includes a projection light arrangement or light source 420 and a projection lens system 460 which are substantially similar to the light source 220 and the projection lens system 260, respectively, and will not be described hereinafter in greater detail.

Considering now the spatial light modulator 440 in greater detail, a projection light emanating from the light source 420 along an input optical path 438 is directed onto a light valve 442 to modulate the projection light to produce the desired projected image. The light valve 442 is connected to a computer 413 by conductor 418 to modulate the projection light. The light valve 442 is preferably a thin film transistor light valve, such as a ferroelectric liquid crystal display or FLCD. Attached to the light valve 442 is a mirror 444 to reflect the modulated projection light as output light along output optical path 458 to be projected onto remote surface 419.

In operation, the projection light is directed onto the light valve 442. The projection light is then modulated by the light valve 442 to generate the desired image. The modified projection light is reflected by the mirror 444 back through the light valve 442 along the output optical path 458 as output light representative of the desired image. The output light is then projected by a projection lens system 460 onto the remote surface 419 for viewing.

Figure 5:
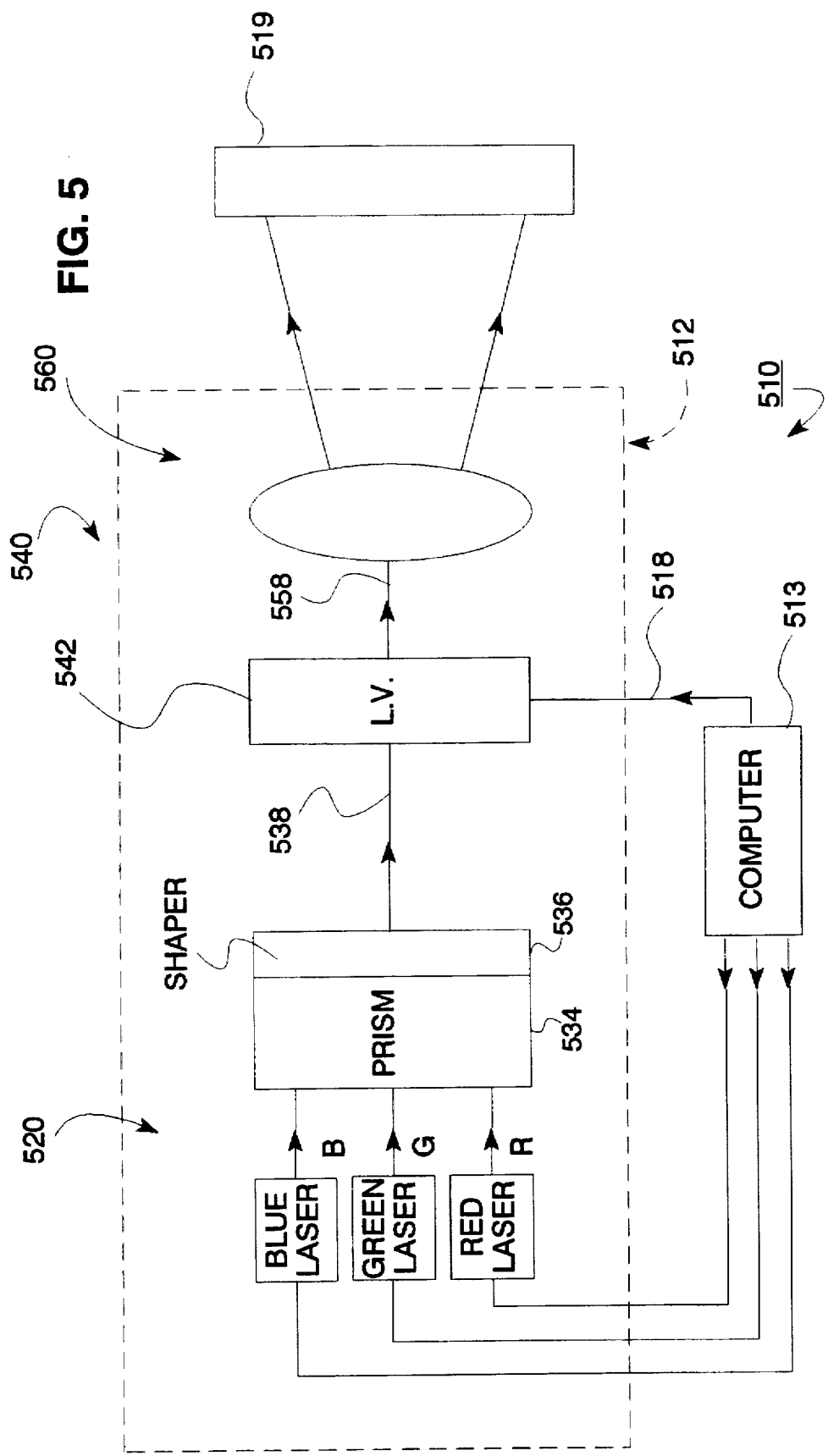
FIG. 5 is a block diagram of yet another laser illuminated image projection system, which is also constructed in accordance with the present invention.

Referring now to FIG. 5, there is shown yet another image projection device 510 which is also constructed in accordance with the present invention. The image projection system 510 includes an image generating arrangement 512 to generate the desired image, a computer 513 to control the operation of the image generating arrangement 512, and a remote surface 519 to display the desired image.

Considering now the image generating arrangement 512 in greater detail, the image generating arrangement 512 includes a projection light arrangement or light source 520 and a projection lens system 560 which are substantially similar to the light source 220 and the projection lens system 260, respectively, and will not be described hereinafter in greater detail. The image generating arrangement 512 further includes a light valve 542 to modulate projection light generated by the light source 520 along an input optical path 548. Light valve 542 is substantially similar to the light valve 442. However, the light valve 542 operates as a transmissive light valve instead of a reflective light valve. In this regard, the light valve 542 modulates the projection light along the input optical path 538 to produce output light representative of the desired image along output optical path 558, wherein the projection light passes through, or is transmitted through, the light valve 542 as the output light.

Figure 6:
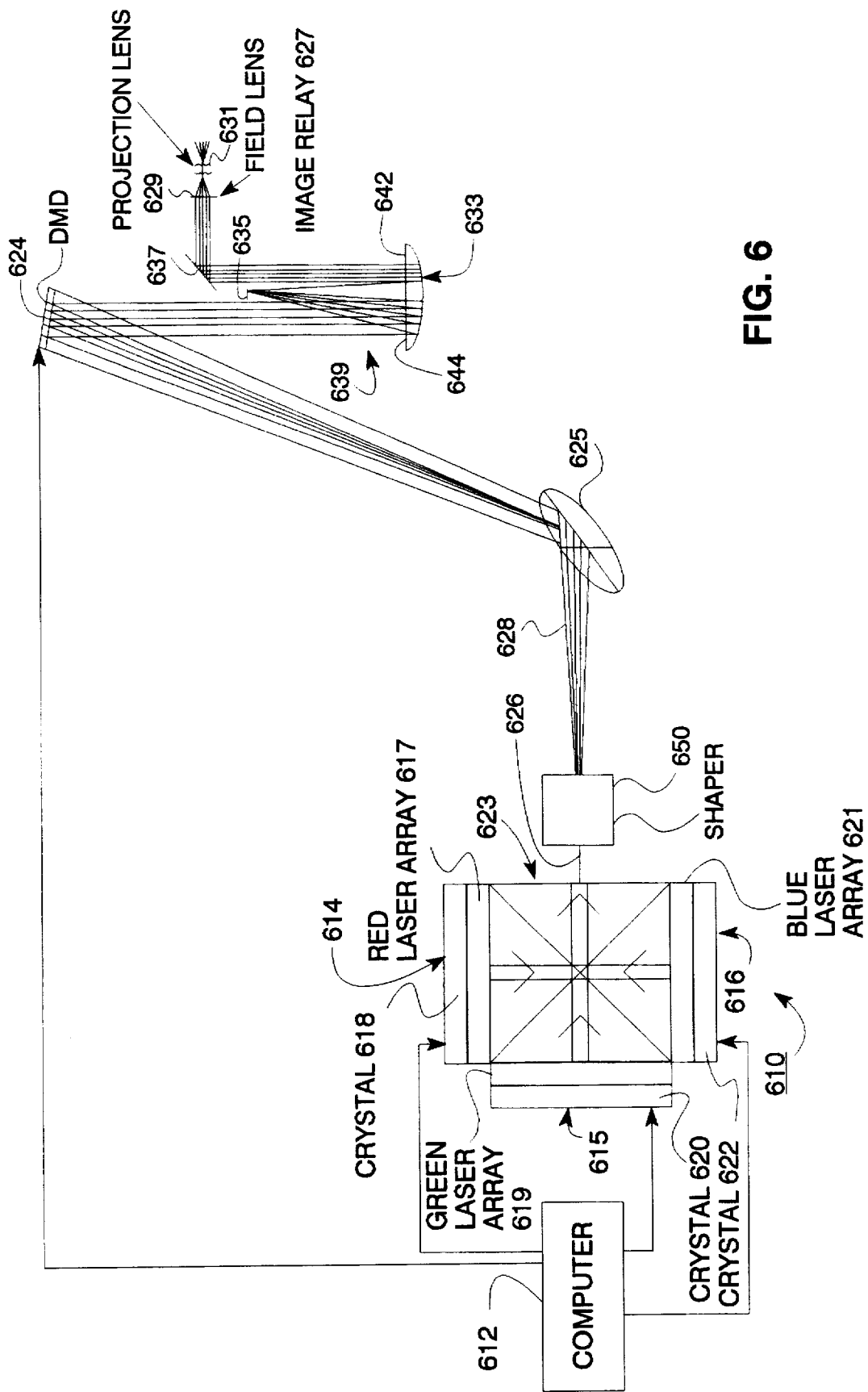
FIG. 6 is a block diagram of still another laser illuminated image projection system, which is also constructed in accordance with the present invention.

Referring now to FIG. 6, there is shown an image projection system 610, which is also constructed in accordance with the present invention. The image projection system 610 is controlled by computer 612 and is able to project an image to a remote viewing surface (not shown).

The system 610 includes a red laser source 614, a green laser source 615, and a blue laser source 616. The red laser source 614 is shown diagrammatically as having a red laser array 617 and a red crystal 618. Similarly, the green laser source 615 is represented diagrammatically as having a green laser array 619 and a green crystal 620, and the blue laser source 616 is represented diagrammatically as having a blue laser array 621 and blue crystal 622.

An immersed egg-crate dichroic mirror assembly 623 combines the three monocolored laser lights into a single combined light beam generally indicated at 626. Examples of immersed egg-crate dichroic mirrors are described in U.S. Pat. No. 2,740,829, entitled "PROJECTION COLOR TELEVISION RECEIVER," and U.S. Pat. No. 2,945,413, entitled "OPTICAL BEAM LINKING SYSTEMS," which are incorporated by reference as if fully set forth herein.

As indicated diagrammatically in FIG. 6, the three laser sources 614, 615 and 616 are disposed on three faces of the mirror assembly 623. The three laser arrays 617, 619, and 621 are representative of monolithic linear or monolithic two dimensional array of microlasers.

A beam shaper 650 transforms the light beam 626 into projection light beam 628, wherein the intensity profile of the light beam 626 is transformed from a Gaussian intensity profile to a uniform intensity profile. In addition, the circular characteristic of each individual light beam is transformed to match the geometry of a spatial light modulator 624.

A deformable mirror device 624 serves as a spatial light modulator to form a bright image from the projection light beam 628 reflected thereto via a circular mirror 625 tilted at an oblique angle to direct the light to the deformable mirror device 624. An image relay arrangement generally indicated at 627 provides a folded light path for the ON reflected light from the deformable mirror device 624 for directing the reflected ON light to a field lens 629, which in turn conveys the light to a projection lens 631 for projecting an enlarged image onto the remote viewing surface (not shown).

An image relaying arrangement 627 employs a concave spherical mirror 633 which reflects the ON reflected light from the deformable mirror device 624 to a convex mirror 635, which in turn causes its reflected light to impinge back onto the concave spherical mirror 633. A mirror 637 reflects the light from the concave spherical mirror 633 to the field lens 629. In this manner, the image relay arrangement 627 provides a folded optical path between the deformable mirror device 624 and the field lens 629.

The deformable mirror device 624 employs a matrix of individual pixel mirrors (not shown) which are movable between a position for reflecting the ON beam toward the concave spherical mirror 633, and another position to reflect the beam away from the concave spherical mirror 633 and toward a black baffle (not shown) for absorbing the OFF reflected beam. In this manner, an image is formed from the projection light beam 678 for projecting it by means of the projection lens 631 via the field lens 629 and the image relay arrangement 627. The circular mirror 625 is tilted at an oblique angle to align it with the tilted pixel mirrors of the deformable mirror device 624.

It should be understood that the reflected ON light beams 639 from the deformable mirror device 624 must be of a sufficient length relative to the projection lens 631 to provide the desired magnification of the projected image. However, in order to have an overall compact configuration for the system 610, the image relay arrangement 627 provides a folded light path to enable the projection lens 631 to be disposed in a compact manner relative to the deformable mirror device 624. Additionally, the image relay arrangement 627 also has the advantage that the overall contrast of the projected image is of a high quality, since the OFF reflected light beams (not shown) from the deformable mirror device 624 will less likely interfere with ON reflected beam from the deformable mirror device 624 entering the projection lens 631 to reduce the contrast between the ON and OFF pixels of the resulting image.

Additionally, the image relay arrangement 627 provides the advantage that a speckle eliminator (not shown) can be conveniently located at or near the field lens 629 and the projection lens 631 in a convenient manner within a same compact housing (not shown) for the system 610 if such a speckle eliminator is not included in the beam shaper 650. Such a speckle eliminator is usually desirable when the source of illumination is by a laser source.

Keystone correction is accomplished by offsetting the relay lens and the projection lens 631. In this manner, the light exiting the projection lens 631 may be corrected in a convenient manner. The projection lens 631 is a four element Tessar lens configuration. It may also be a six element Orthometer design form configuration. In either form of the lens assembly, a small aperture helps provide high contrast for the resulting image.

Figure 7:
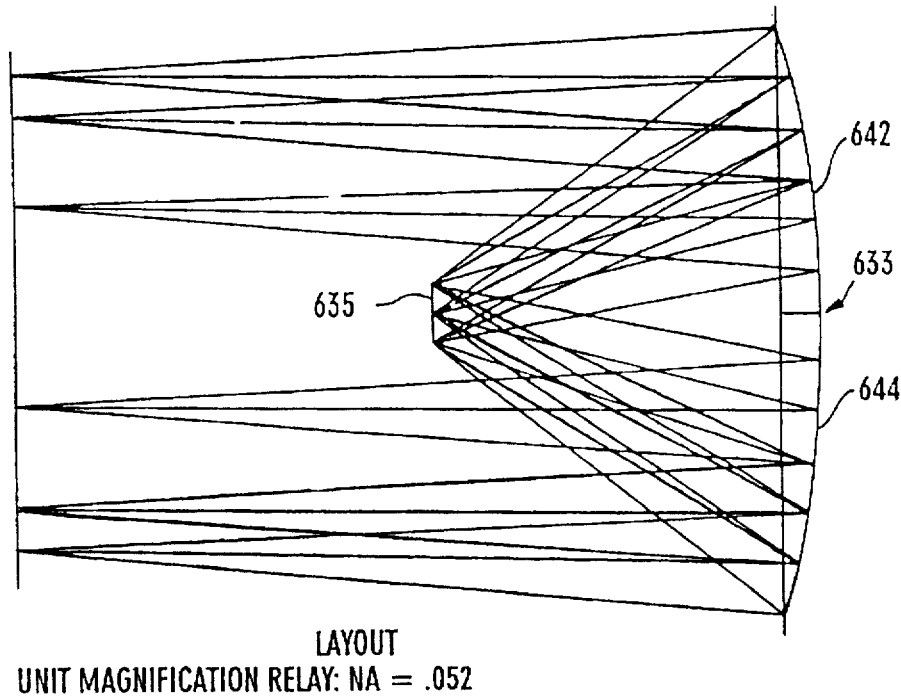
FIG. 7 is an enlarged view of an image relay of FIG. 6.

The concave spherical mirror 633 comprises a pair of concentric spherical mirrors 642 and 644 so that there are no third order aberrations. As shown in FIG. 7 in greater detail, the concave spherical mirror 633 provides a pre-lane of the image and Offner autocollimating telescope approach. Thus, in accordance with an important feature of the present invention, the image from the deformable mirror device 624 is relayed to the field lens 629 so that the projection lens 631 can be mounted in relationship to the field lens 629 in a compact overall arrangement.

Figure 8:
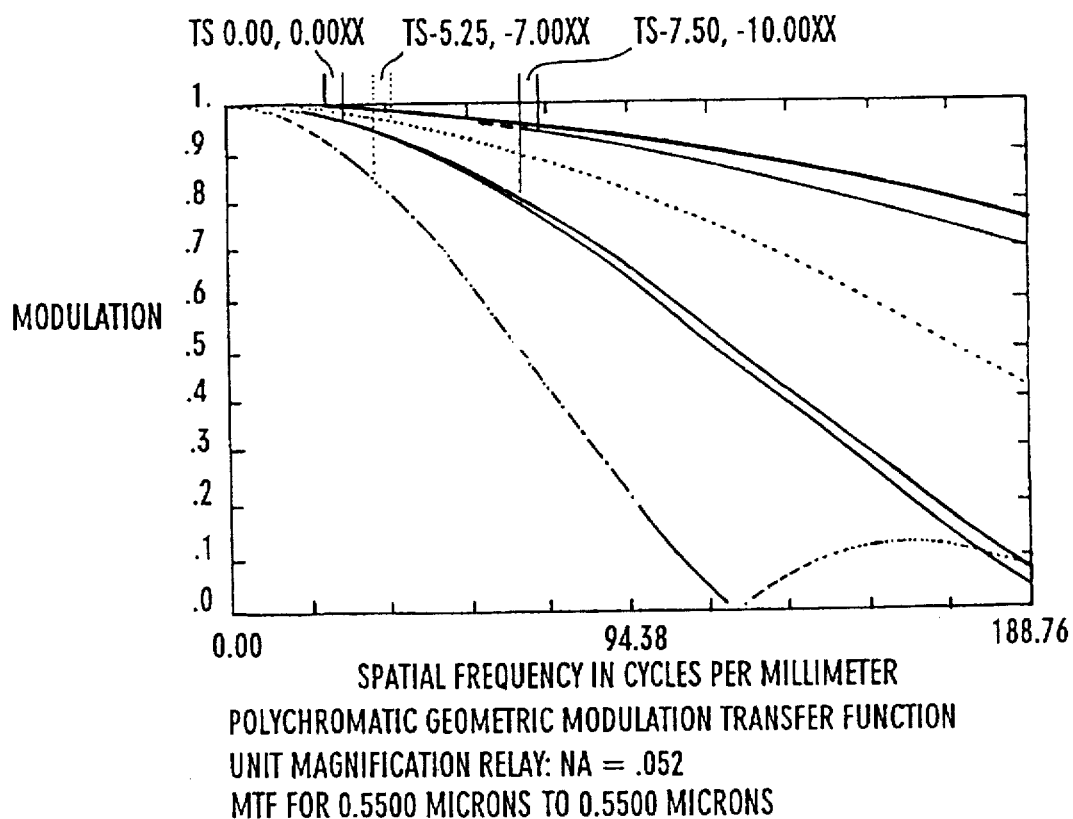
FIG. 8 is a graph representative of the polychromatic geometric modulation transfer function associated with the image relay of FIGS. 6 and 7.

Referring now to FIG. 8, there is shown the polychromatic geometric modulation transfer function relative to the spatial frequency. This illustrates the unit magnification of the UA arrangement.

LASER PULSING ARRANGEMENT

In accordance with the present invention, the microlasers of the laser sources 614, 615 and 616 of the system 610 are sequentially pulsed in accordance with the present invention to achieve a bright projected image at a favorable of cost of energizing the microlasers in a highly efficient manner. In this regard, the microlasers of each one of the image projection systems of FIGS. 2–5, are also pulsed in the same inventive manner as the microlasers of laser sources 614, 615 and 616 of the system 610 as hereinafter described in greater detail.

Under computer control, the microlasers generate a plurality of different color laser lights. Also under computer control, the microlasers cause the laser lights produced thereby to be individually and sequentially pulsed to cause them to be energized at a substantially peak ON output luminosity for a short ON period of time, thereby providing a high average output luminosity at a low average energy cost.

Each one of the microlasers is controlled by the computer individually and sequentially to cause them to be deactivated at a near ON output luminosity for a short OFF period of time to enable the microlaser light beams to switch between OFF and ON in an efficient manner. As a result, a bright image is formed from the combined laser light beams.

By operating the microlasers of the microlaser arrays in a pulsed manner substantially at their peak outputs, the resulting projected image is very bright. If the microlasers are continuously operated at their peak output, the useful lives of the microlasers of laser sources 614, 615 and 616 are drastically reduced. Therefore, the microlasers are pulsed ON and OFF during the same frame time of the projection system. In this regard, the microlasers are operated sequentially during the same frame time and preferably, each one is ON for one-third of a frame interval. Thus, for example, the average power consumed by the microlasers is only approximately one-third of the peak power. Additionally, in accordance with the present invention, the microlasers are biased nearly ON during their OFF period of time so that the crystals of the microlasers of each microlaser array are operating at or near a preferred condition. In this regard, when the microlaser is OFF, it is prepared to go back ON in a most efficient and effective manner. Thus, the luminosity output of the microlasers is even greater due to the higher efficiency operation of the microlasers so that the input energy to the microlasers is proportionally decreased as a result. In short, the microlasers are pulsed according to the invention to provide an extremely hot bright output light at a low input energy level in a highly efficient manner, so that the resulting output luminosity is at or near its maximum at a relatively low cost of operation due to the high efficiency.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An image producing system, comprising:
    a spatial light modulator means for generating an image to be projected onto a remote viewing surface;
    a beam shaping means for directing uniformly distributed high intensity light onto said modulator means in registration therewith for illumination purposes; and
    said beam shaping means including means for sampling coherent light to and from a group of diverging light beams to expand onto an overlapping pattern and for imaging the pattern onto said modulator means; and
    laser means for generating high intensity coherent light.

2. A system according to claim 1, wherein said beam shaping means including a beam sampling microlens array for sampling non-uniform intensity coherent light from said laser means to produce a group of diverging, said first array including a plurality of microlenses, each having a generally rectangular configuration generally similar to the configuration of said modulator means to cause the diverging light beams to each have a rectangular cross section proportional to the shape of said modulator means.

3. A system according to claim 2, wherein said beam shaping means includes, an imaging microlens array disposed in a spaced apart relationship relative to said sampling lens array, said imaging lens array including a plurality of microlenses for focusing the overlapping pattern onto said modulator means.

4. A system according to claim 3, wherein said beam shaping means includes a field lens for helping focus light emitted from said imaging microlens array onto said modulator means.

5. An image producing system according to claim 1, wherein said light source means preferably includes a multiplicity of microlaser elements.

6. An image producing system according to claim 5, wherein said multiplicity of microlaser elements preferably is a microlaser array.

7. An image producing system according to claim 6, wherein each of said microlaser elements preferably is a diode pumped solid-state laser.

8. An image producing system according to claim 6, wherein said microlaser array is a monolithic linear microlaser array.

9. An image producing system according to claim 6, wherein said microlaser array is preferably a two dimensional microlaser array.

10. An image producing system according to claim 1, wherein said laser means is light source means including at least one laser device switchable between an on state and an off state for generating pulses of coherent projection light along an input optical path, wherein said coherent projection light is generated at a maximum luminosity level when said laser device is switched to said on state;
    wherein said spatial light modulator means is disposed in said input optical path for modulating said coherent projection light to produce output light representative of the image along an output optical path for facilitating the projection of the image onto a remote surface, wherein substantially all of said output light produced by said spatial light modulator means is projected onto said remote surface; and
    said spatial light modulator means includes a light valve for controlling the luminosity of said output light produced by said spatial light modulator means to facilitate reproducing the image with varying shades on said remote surface.

11. An image producing system according to claim 10, wherein said light source means includes at least three laser devices, said laser devices including a red laser device, a green laser device, and a blue laser device which are each switched between their on and off states to generate sequential mono-colored pulses of coherent projection light for facilitating the reproduction of the image in full color.

12. An image producing system according to claim 10, wherein said light valve is reflective.

13. An image producing system according to claim 12, wherein said light valve is beam addressed.

14. An image producing system according to claim 13, wherein said light valve is a photoelectric liquid crystal device.

15. An image producing system according to claim 14, wherein said spatial light modulator means further includes a writing means to generate the image to be projected and a fiber optic plate disposed between said photoelectric liquid crystal device and said writing means to optically transfer the image from said writing means to said photoelectric liquid crystal device.

16. An image producing system according to claim 15, wherein said writing means includes a cathode ray tube device.

17. An image producing system according to claim 15, wherein said writing means includes a writing light source, and an active matrix liquid crystal device disposed between said writing light source and said fiber optic plate.

18. An image producing system according to claim 12, wherein said spatial light modulator means further includes a mirror device for reflecting modulated coherent projection light to direct it onto said output optical path as said output light.

19. An image producing system according to claim 18, wherein said light valve is a ferroelectric liquid crystal display device.

20. An image producing system according to claim 10, wherein said light valve is transmissive.

21. An image producing system according to claim 20, wherein said light valve is a ferroelectric liquid crystal display device.

22. An image producing system according to claim 10, further including an optical lens for facilitating the coordination of a cross-sectional area of said coherent projection light with a frontal surface area of said light valve to enable substantially all of said coherent projection light to impinge said frontal surface area.

23. An image producing system according to claim 22, wherein said spatial light modulator means further includes means for redirecting said coherent projection light toward said light valve to permit said coherent projection light to impinge said light valve at about a right angle.

24. An image producing system according to claim 23, wherein said redirecting means includes a polarizing beam splitter.

25. An image producing system according to claim 1, wherein said beam shaping means includes a binary phase plate.

26. An image producing system according to claim 1, wherein said beam shaping means includes a holographic diffuser.

27. A method of producing a bright image utilizing a plurality of different colored lasers, comprising:

generating a plurality of different colored laser lights;

controlling each one of the laser lights individually and sequentially to cause them to be energized at a substantially peak ON output luminosity for a short ON period of time, thereby providing a high average output luminosity at a low average energy cost;

controlling each one of the laser lights individually and sequentially to cause them to be deactivated at a near ON output luminosity for a short OFF period of time to enable the laser lights to switch between OFF and ON in an efficient manner;

forming a bright image from the laser lights;

sampling coherent light to form a group of diverging light beams to expand into an overlapping pattern; and imaging the pattern onto said modulator means.

28. A method according to claim 27, further including projecting the bright image.

29. A method according to claim 27, wherein the image is formed by using a deformable mirror device.

30. A method according to claim 29, further including image relaying from the deformable mirror device to shorten effectively the optical path of the ON light reflected from the deformable mirror device.

31. A method according to claim 30, further including using a spherical mirror for image relaying.

32. A method according to claim 27, further including using an emersed eggcrate dichroic mirror assembly to combine the laser lights.

33. A system for producing a bright image comprising:

a plurality of lasers for generating a plurality of different colored laser lights;

means for controlling each one of the lasers individually and sequentially to cause them to be energized at a substantially peak ON output luminosity for a short ON period of time, thereby providing a high average output luminosity at a low average energy cost;

means for controlling each on of the lasers individually and sequentially to cause them to be deactivated at a near ON output luminosity for a short OFF period of time to enable the lasers to switch between OFF and ON in an efficient manner;

means for forming a bright image from the laser lights;

means for sampling the laser light to form a group of diverging light beams to expand into an overlapping pattern and for imaging the pattern onto said means for forming a bright image.

34. A system according to claim 33, further including means for projecting the bright image.

35. A system according to claim 33, wherein said means for forming includes a deformable mirror device.

36. A system according to claim 35, further including an image relaying arrangement for the deformable mirror device to shorten effectively the optical path of the ON light reflected from the deformable mirror device.

37. A system according to claim 36, wherein said arrangement includes a spherical mirror for image relaying purposes.

38. A system according to claim 33, further including an emersed eggcrate dichroic mirror assembly to combine the laser lights.

39. A system according to claim 33, wherein said plurality of lasers preferably is a multiplicity of microlaser elements.

40. A system according to claim 39, wherein said multiplicity of microlaser elements preferably is a microlaser array.

41. A system according to claim 40, wherein each of said microlaser elements preferably is a diode pumped solid-state laser.

42. A system according to claim 40, wherein said microlaser array is a monolithic linear microlaser array.

43. A system according to claim 40, wherein said microlaser array is preferably a two dimensional microlaser array.

44. A method of projecting an image, comprising:

generating pulses of coherent projection light along an input optical path with a light source means including at least one laser device selectively switchable between an on state and an off state, wherein said coherent projection light is generated at a maximum luminosity level when said laser device is switched to said on state;

modulating said coherent projection light with a spatial light modulator means disposed in said input optical path to produce output light representative of the image along an output optical path for facilitating the projection of the image onto a remote surface, wherein substantially all of said output light produced by said spatial light modulator means is projected onto said remote surface;

controlling the luminosity of said output light produced by said spatial light modulator means with a light valve to facilitate reproducing the image with varying shades on said remote surface;

sampling coherent light to form a group of diverging light beams to expand into an overlapping pattern; and imaging the pattern onto said modulator means.

45. A method of projecting an image according to claim 44, further including using a light source including at least three laser devices, said laser devices including a red laser device, a green laser device, and a blue laser device, and switching each of said laser devices between their on and off states to generate sequential mono-colored pulses of coherent projection light for facilitating the reproduction of the image in full color.

* * * * *